United States Patent

Odom

[11] Patent Number: 5,816,633
[45] Date of Patent: Oct. 6, 1998

[54] HANDY DANDY

[76] Inventor: Anthony K. Odom, P.O. Box 85, Deer Park, Ala. 36529

[21] Appl. No.: 832,108

[22] Filed: Apr. 3, 1997

[51] Int. Cl.⁶ .................................................. A01B 1/20
[52] U.S. Cl. ................................. 294/51; 294/59; 7/116; 172/375
[58] Field of Search ........................ 294/49, 51, 57–60; 7/114–116, 143, 167; 172/372–375

[56] References Cited

U.S. PATENT DOCUMENTS

| | | | |
|---|---|---|---|
| 253,929 | 2/1882 | Lee | 294/51 |
| 576,756 | 2/1897 | Cole | 7/116 |
| 4,162,132 | 7/1979 | Kress et al. | 403/361 |
| 4,476,939 | 10/1984 | Wallace | 294/51 |
| 4,565,398 | 1/1986 | Poulin | 294/52 |
| 4,901,801 | 2/1990 | Popivalo | 172/375 |
| 5,103,520 | 4/1992 | Mazzo | 7/143 |
| 5,185,992 | 2/1993 | Garcia | 56/200.04 |
| 5,507,051 | 4/1996 | Mazon | 7/116 |

FOREIGN PATENT DOCUMENTS 2580-138 10/1986 France .................................. 294/49

Primary Examiner—Dean Kramer
Attorney, Agent, or Firm—Patent & Trademark Services, Inc.; Thomas Zack; Joseph H. McGlynn

[57] ABSTRACT

A tool having a common handle and multiple interchangeable heads coupled with a side impact hammer handle mount and movable hammer. Several different common configured tool heads may be retained by a mount assembly located in the handle front end. This front mount assembly has retaining tangs which are biased to hold an inserted tool head. The impact hammer may be used while a tool head is mounted in the handle or separately by itself to break rock or hard ground. Tool heads that are disclosed include round and square shovel heads, a blade head, a rake and pitchfork head and a hoe.

8 Claims, 2 Drawing Sheets

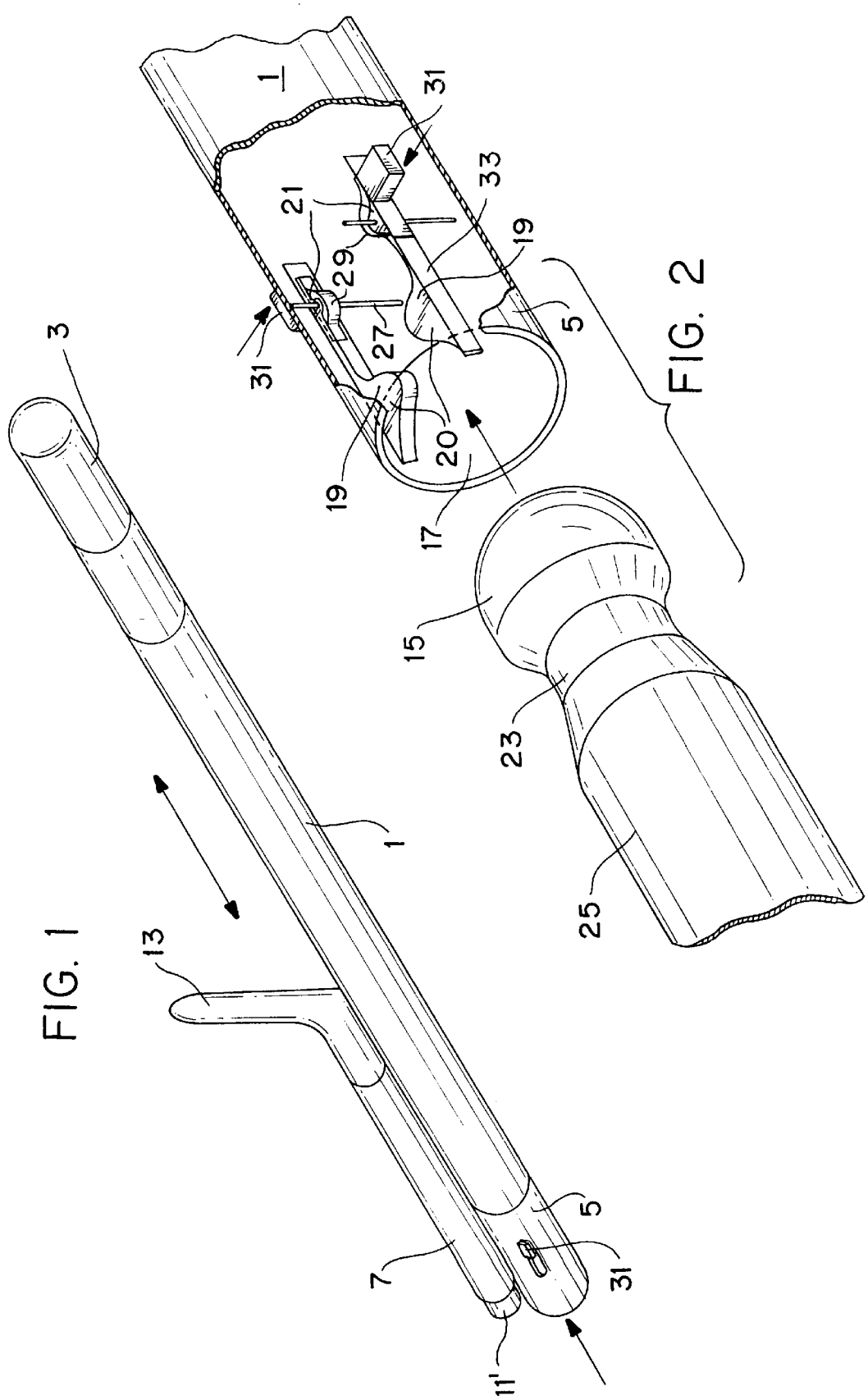

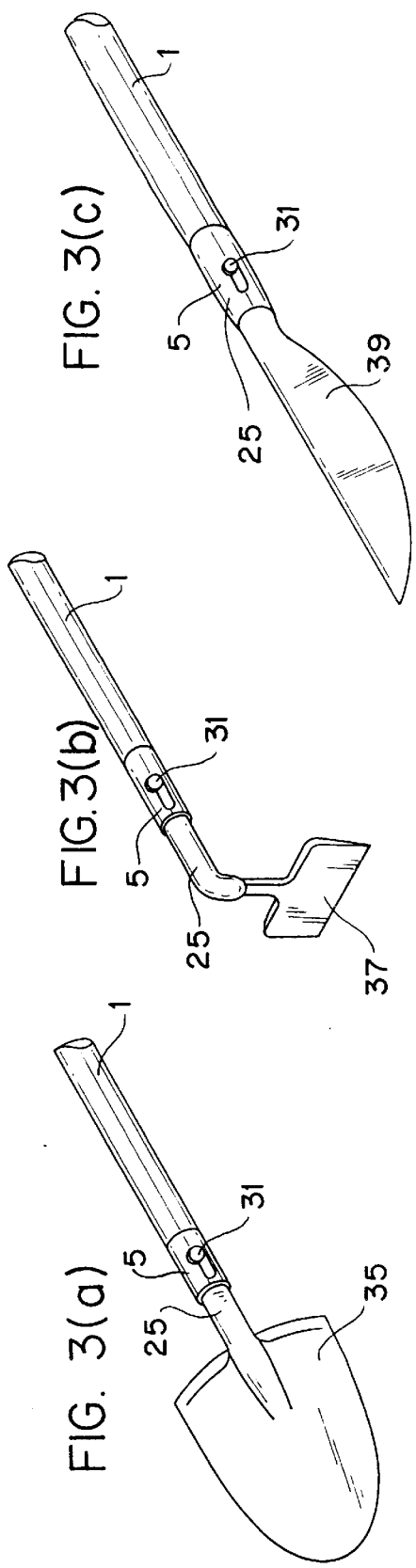
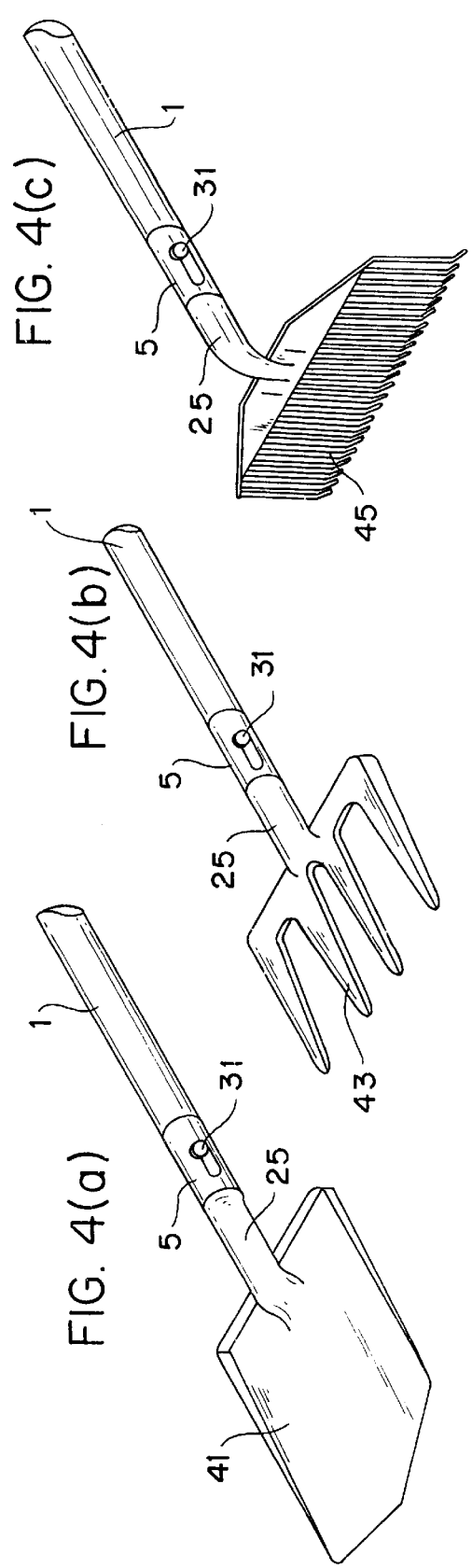

HANDY DANDY

BACKGROUND OF THE INVENTION

Tools used to work the earth have been used for as long as man can remember. To provide greater versatility in their use, a common handle can be provided with different multiple interchangeable heads that permit different functions to be performed more effectively. These interchangeable heads could be configured as besoms, rakes, hoes, harrows and the like. The present invention provides for such a tool having a common handle with multiple interchangeable heads that not only allow a great variety of different functions but permits the ground to be broken by an impact hammer while any of these heads are in place.

DESCRIPTION OF THE PRIOR ART

Multiple head garden and other tools are known in the prior art. For example, U.S. Pat. No. 4,162,132 to Kress et al. discloses a handle on which can be mounted various different garden tools or household implement heads. The invention to Poulin (U.S. Pat. No. 4,565,398) describes such a tool wherein an angularly adjustable clamp can mount the different interchangeable too heads in a variety of angular positions. The Popivalo invention (U.S. Pat. No. 4,901,801) discloses a garden tool with a two sided head; one having a pronged tool and the other a blade. And in U.S. Pat. No. 5,185,992 to Garcia a handle with a bayonet or coil spring/pin assembly (FIG. 3) connector to attach a variety of different tool heads. The present invention provides for a common handle on which a variety of different tool heads may be mounted coupled with a side impact hammer on the handle to break the ground as more further set forth in this specification.

SUMMARY OF THE INVENTION

This invention relates to a tool having a common handle and multiple interchangeable heads. Mounting handle structure is provided for each of these heads and there is an additional handle mount for a movable impact hammer. The impact hammer may be used in conjunction with the mounted heads or by itself to break apart the ground when needed.

It is the primary object of the present invention to provide for an improved multiple purpose tool having a common handle.

Another object is to provide for such a tool wherein different tool heads may be used in conjunction or separate from an impact hammer on the same handle.

These and other objects and advantages of the present invention will become apparent to readers from a consideration of the ensuing description and the accompanying drawings.

BRIEF DESCRIPTION OF THE DRAWINGS

FIG. 1 is a side view of the invention's preferred embodiment.

FIG. 2 is an enlarged sectional view of the multi-tool mount used in the FIG. 1 embodiment showing its end engaging a tool head.

FIGS. 3(a)–(c) and 4(a)–(c) show side perspective views of different tool heads as mounted on the front end of a common handle.

DESCRIPTION OF THE PREFERRED EMBODIMENT

FIG. 1 is a side view of the invention's preferred embodiment. A common elongated cylindrical wood or metal handle 1 has an upper or top end 3 by which a user grabs it with their hands. Located at the handle's front or bottom end is a head mounting assembly 5 used to hold and mount interchangeable tool heads to the common handle 1. Extending in the same direction as the handle 1 and attached to it near its front end is a cylindrical hollow tube 7. Reciprocally mounted within tube 7 is an impact hammer whose front ground (rock or soil) engaging front end 11 is depicted extending out of the tube's front end. Movable with this impact hammer is the L-shaped hand engaging handle 13 used to lift the hammer as it rides in tube support 7 and then move the hammer downwardly towards the ground to break apart rocks or hard soil. An internal spring with a latch mechanism or a like force multiplier mechanism located within tube 7 may be used to supplement the hammer's weight to supply an added multiplying force to the downward gravity force supplied.

FIG. 2 is an enlarged sectional view of the multi-tool mount 5 used in the FIG. 1 embodiment showing its enlarged end engaging the end of a ball shaped tool head 15. To reduce its weight the handle 1 can be made of a hollow strong metal material whose front end terminates at universal tool head mount assembly 5. As shown in this enlarged sectional view the opened front end 17 is configured and sized to receive the male round end 15 for the tool head. When inserted into the mount's 5 internal cavity the end 15 initially engages two opposite spaced spring loaded tangs 19. Each tang has an enlarged smooth front end 20 configured like the curve of a graph which can ride on the tool head end 15 surface. Forcing the end 15 into the tangs causes ends 20 to initially expand outwardly towards the opposite internal walls of the mount 5 to permit the end 15 to extend further into the mount's cavity. After the rounded tool end 15 has passed by the enlarged tang ends 20, the tangs' associated springs 21 bias the expanded tangs towards each other where they engage the tool head's internal reduced diameter groove 23 located on the tool head's front 25 behind the ball front end 15. Two internal parallel retaining pin members 27 mount the tangs 19 to the internal side walls of the mount 5 by engaging a hole in the internal mounts 29. Also engaged by the tang's far ends is an external button 31 extending through a mount wall slot 33. Once, the tool head 15 is inserted past the enlarged front ends of the tangs 19 the head is retained therein by the configuration of the tangs and the biasing action of the two side springs 21 which force the tangs' enlarged ends 20 to engage the head's area 23. To release the tool's head the two side buttons 31 are each pressed towards each other which forces the enlarged tang ends to move apart and permits the tool head 25 to be pull out from the mount 5 past them.

FIGS. 3(a)–(c) and 4(a)–(c) shows side perspective views of different tool heads mounted on the front end of a partially shown common handle 1 at the handle's front mount 5. Each tool head end 25 would have an engaging end like the rounded end 15 with its reduced diameter groove 23 previously described with respect to FIG. 2. The tool head's ground engaging configuration may be shaped to resemble a great variety of common garden or other tools. For example, in FIG. 3(a) the tool head resembles a round head shovel 35, while the FIG. 3(b) tool head 37 resembles a common hoe. Similarly the tool head 39 shown in FIG. 3(c) is configured like a blade tool. FIGS. 4(a) (c) depict still more tool heads which can be used with the partially shown common handle 1. FIG. 4(a) illustrates a squared head shovel tool attachment 41 and FIG. 4(b) shows a pitchfork tool attachment 43 with four spaced prongs extending in the same direction as the elongated handle 1. FIG. 4(c) has a rake tool attachment head 45 with over a dozen spaced prongs that extend perpendicular to the direction of the elongated handle.

Each of the FIGS. 3 and 4 tool heads is mounted to the common handle mount 5 as previously described by forcing it past the mount's internal enlarged tang ends 20 until its enlarged rounded end 15 is retained therein. Each tool head is released by pressing the two side handle mount buttons 31 and pulling the tool head away from the mount 5.

The handle 13 and female impact hammer 9 components are best manufactured of heavy gauge steel tubing. The common handle 1 could be made of wood or hollow stamped metal with its mount end 5 being of a hollow metal material. The internal tang, spring and other tool head retaining components are available as "off the shelf" components. The various tool head attachments may be manufactured by metal stamping/forming techniques or by the metal punching process. The metal punching process involves a male and female die, both are which are machined into the shape of the desired finished product. The dies are made of hardened tool steel, and are placed in the jaws of a hydraulic press. In operation, the steel material to be punched is placed between the two die components and the hydraulic press activated. The two dies quickly "punch out" the desired shape from the sheet metal, producing the desired metal component.

The die casting of metal is a process which involves injection of the molten metal alloy into hardened dies. The hollow die consists of two or more parts which form a negative version of the cast part. After the metal is injected and allowed to cool, a completed part having great detail is removed from the dies. Metal stamping is a process whereby flat metal is formed between two parts of a die under tremendous pressure. The metal can be punched, formed and shaped in these dies, many times in one process, and spot welding of separate components can be employed to complete the assembly of sheet metal components. The stamped metal may be stainless steel or plated carbon steel to prevent rusting.

The tool components of this invention may also be manufactured using what is known as the lost wax method of casting, also known as investment casting. This process starts with an exact model of the component to be cast fabricated from wood, metal or plastic material. A rubber mold is made of the piece and wax is cast into the mold making an exact replica in hard wax. Next, the wax model is placed in a box filled with material known as "green sand". The sand is compacted around the wax component, with a wax shaft leading from the wax model to the outside of the sand form. The sand is allowed to dry. The entire box is placed in an oven which melts or burns out the wax model, leaving a hollow cavity in the green sand which is an exact duplicate of the melted wax. Molten brass is poured into the hole left by the melted wax shaft, allowing the brass to flow into the cavity. Once the brass solidifies, the and is removed and cleaned from the brass piece. The brass piece is checked for voids, rough edges and polished after inspection for these and other potential defects. Details such as threads or fine markings are performed as a secondary machining procedure. The investment casting process is performed by a number of factories in the United States, Canada and Mexico. The procedure involves automatic and semi-automatic manufacturing processes.

A newer process called the investment foam casting process is very much similar to the lost wax process. The wax is replaced with a high density Styrofoam which has been created by injecting foam into a highly detailed mold. The Styrofoam shape is coated with liquid ceramic before being cast. The process is otherwise almost identical to the wax process described above.

All of the metal components may be coated or painted by power coating which involves the electrostatic application of resin plastic materials which are charged and then baked to provide a beautiful painted very durable look.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A tool having a single handle with multiple interchangeable heads for the handle comprising:

an elongated handle having a front mounting assembly for mounting interchangeable tool heads, said mounting assembly having retaining members biased to retain an inserted end of a tool head;

an impact hammer mount fixed to said handle; and a movable impact hammer mounted in said hammer mount and adapted to engage the ground with an impact force, said hammer having an upper extending handle to control the hammer's movement.

2. The tool as claimed in claim 1, also including a tool mounted head having an enlarged rounded front end which is engaged and retained by handle's retaining members when inserted therein.

3. The tool as claimed in claim 2, wherein said tool mounted head is configured as a round head shovel.

4. The tool as claimed in claim 1, wherein said tool mounted head is configured as a hoe.

5. The tool as claimed in claim 1, wherein said tool mounted head is configured as an elongated blade.

6. The tool as claimed in claim 1, wherein said tool mounted head is configured as a squared shovel head.

7. The tool as claimed in claim 1, wherein said tool mounted head is configured as a rake with a plurality of spaced prongs that extend perpendicular to the direction of the elongated handle.

8. The tool as claimed in claim 1, wherein said tool mounted head is configured as a pitchfork with several spaced prongs extending in the same general direction as the elongated handle.

* * * * *